United States Patent [19]

von Sivers

[11] Patent Number: 4,531,761
[45] Date of Patent: Jul. 30, 1985

[54] APPARATUS FOR VIBRATION ISOLATION ATTACHMENT OF SUBFRAME OR AGGREGATE HOLDER

[75] Inventor: Rolf von Sivers, Rutesheim, Fed. Rep. of Germany

[73] Assignee: Dr. Ing. h.c.F. Porsche Aktiengesellschaft, Stuttgart, Fed. Rep. of Germany

[21] Appl. No.: 479,149

[22] Filed: Mar. 28, 1983

[30] Foreign Application Priority Data

May 13, 1982 [DE] Fed. Rep. of Germany ....... 3217959

[51] Int. Cl.³ ............................................. B62D 21/00
[52] U.S. Cl. .................. 280/785; 267/63 R; 280/716; 280/788
[58] Field of Search ............... 280/666, 716, 724, 785, 280/788; 267/21 R, 21 A, 63 R, 63 A

[56] References Cited

U.S. PATENT DOCUMENTS 2,755,056 7/1956 Hutton ............................. 267/63 A
2,838,339 6/1958 Schaldenbrand ................. 267/21 R
3,508,745 4/1970 Deane ............................... 267/63 R
3,809,427 5/1974 Bennett ............................ 267/63 R
3,814,412 6/1974 Britton et al. .................... 267/63 R
3,881,767 5/1975 Klees ............................... 267/63 R

FOREIGN PATENT DOCUMENTS 2930695 2/1981 Fed. Rep. of Germany .
677983 8/1952 United Kingdom .
2054486A 7/1980 United Kingdom .

Primary Examiner—Joseph F. Peters, Jr.
Assistant Examiner—Kenneth R. Rice
Attorney, Agent, or Firm—Barnes & Thornburg

[57] ABSTRACT

The connection of a vehicle subframe with a frame of a motor vehicle is effected by an elastic bearing support. In order that the vibrations from the vehicle subframe are not transmitted to the frame, elements are provided in the region of the support for the bearing frame which increase the impedance. This results in a shielding of the frame from these vibrations.

20 Claims, 2 Drawing Figures

APPARATUS FOR VIBRATION ISOLATION ATTACHMENT OF SUBFRAME OR AGGREGATE HOLDER

BACKGROUND AND SUMMARY OF THE INVENTION

The invention relates to an apparatus for vibration isolation attachment of a subframe or aggregate holder at a support member of a main frame structure of a motor vehicle under the disposition of an elastic bearing with a metal bearing core and with a sheet metal cover connected by vulcanizing thereto, whereby the bearing core is connected at its front side with the support member of the main frame structure.

DE-OS (German unexamined published application) No. 29 30 695 makes known an elastic bearing for the attachment of a subframe at a support member of a frame of a motor vehicle. The subframe is connected to the bearing with an elastic bushing whereby the bearing core or shaft is held at the frame support member by means of an interposed pot-shaped bracket. The frame support member is formed with a cross section having a U-shaped profile and is closed or covered by means of a bottom or floor plate. This arrangement exhibits the disadvantage that vibrations caused by uneven road surfaces or other special influences are transmitted through the bearing to the frame support members of the frame structure and cause disturbing noises.

The invention is concerned with the problem of creating an apparatus of the above-mentioned type, wherein the transmission of vibrations to the basic frame structure of the motor vehicle caused by the dynamics of vehicle driving are substantially avoided.

This problem is inventably solved by providing that the subframe is supported at the mainframe support member by way of a bearing with an elastic bushing having a large support area base at the bearing core and by providing impedance increasing elements in the region of the bearing support, which elements form a vibration obstructing or deflecting plane between the elastic bearing and the main frame support member.

A principal advantage obtained with the invention is that the vibrations from the vehicle wheels of different orders of magnitude that are transmitted to the subframe are further transferred to the support member of the main frame only after they have been strongly damped, since a separating plane is created at the separating point of the support member and the support surface of the bearing core or shaft. This advantage is obtained by means of point support reinforcement of the support member in the anchoring region of the bearing as well as by means of vibration resistant point masses acting against the vibrations. The increased impedance of the stiffening, or reinforcement as well as the mass accummulation in the region of the bearing results in an insensitivity with respect to the transmitted vibrations from the subframe via the elastic bearing. The support of the bearing core at the frame support member is provided with a large input impedance loaded support area, thereby resulting in a high vibration damping with respect to the vehicle body.

The elastic bearing is so constructed that the subframe can be assembled with the bearing in a simple manner. The elastic bearing is pressed into a corresponding opening of the subframe beam or girder and is further connected together with the frame support member bearer or beam. At the circumference of the elastic part of the bearing, a clamping seat is provided with a fixed or rigid abutment for yieldingly supporting the subframe support member in its verticle primary loading direction. Opposite this abutment an annular ring is provided on the elastic part for clamping and griping the subframe support member at its underside. Simultaneously this annular ring serves as an elastic abutment part during tension loading of the subframe. To balance undesirable tolerance conditions as well as to provide initial damping for vibrations, an elastic layer is provided between the subframe and a sheet metal cover of the elastic bearing. This elastic layer exhibits a thickness and profile shape (ribs and the like) corresponding to the tolerances and required characteristics.

An exemplary embodiment of the invention is shown in the drawings and described in more detail in the following description.

These and further objects, features and advantages of the present invention will become more obvious from the following description when taken in connection with the accompanying drawings which shows, for purposes of illustration only, several embodiments in accordance with the present invention.

DETAILED DESCRIPTION OF THE DRAWINGS

Figure 1:
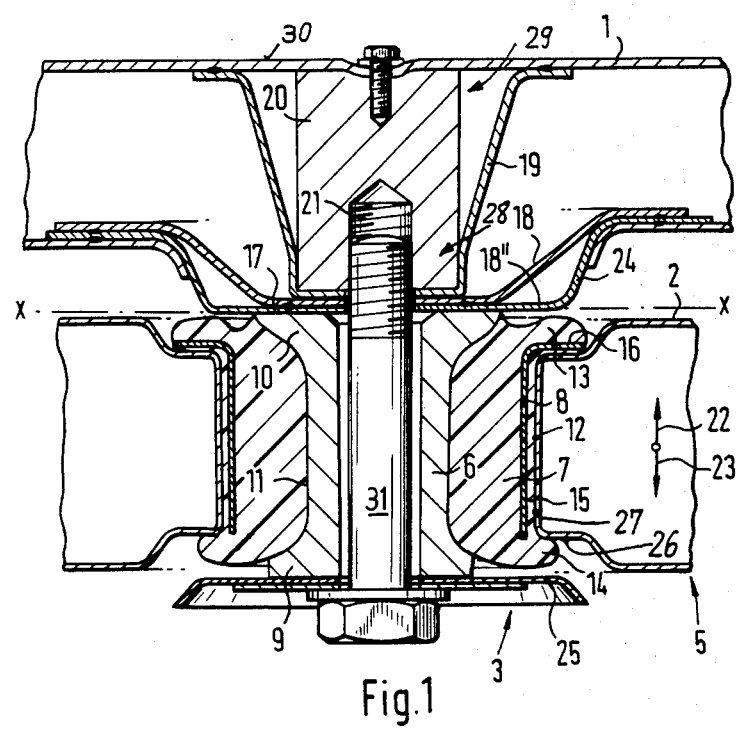
FIG. 1 is a sectional view of a first embodiment of attachment apparatus for a subframe to a support member of a frame structure of a motor vehicle.
Figure 2:
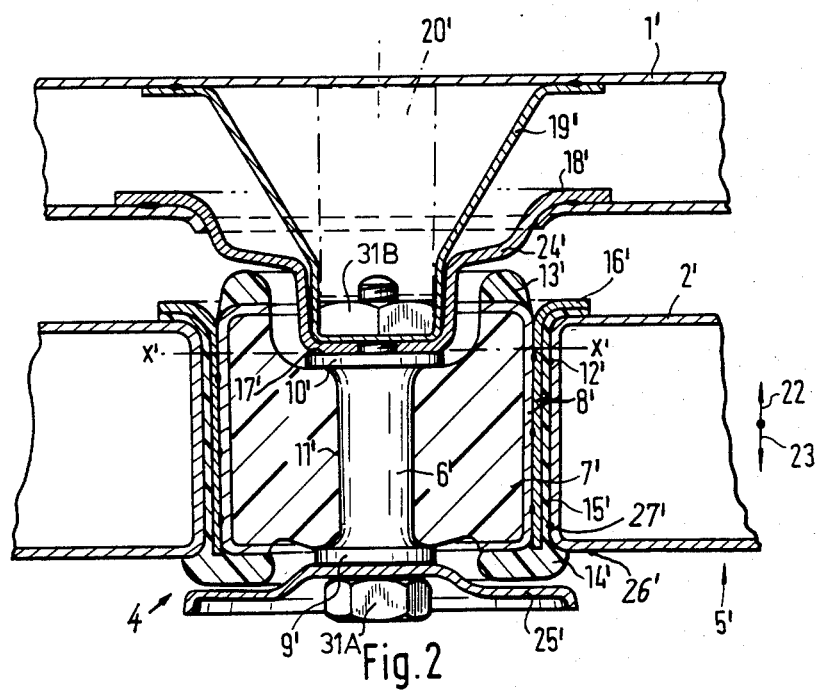
FIG. 2 is a sectional view through a further embodiment of an attachment apparatus.

In the illustrated embodiments of FIGS. 1 and 2 two hollow section profile configured support members (beams) 1, 1' and 2, 2' are elastically moveably connected with one another by means of an interposed elastic bearing 3 (FIG. 1) and 4 (FIG. 2). The support member 1, 1' is part of a frame of a main frame structure of a not further illustrated vehicle, whereas the support member 2, 2' is part of a vehicle running gear, for example a subframe 5, 5' or an aggregate holder of the vehicle.

The elastic bearings 3; 4 each comprise a metallic bearing core or shaft 6, 6' which is surrounded by an elastic element formed as a bushing 7, 7'. This bushing 7, 7' contains a sheet metal cover 8, 8' which extends partly at the outer surface of the bushing 7, 7' and partly also into the inside of the bushing 7, 7'. In the following description similar reference characters are used for similar parts of both bearings 3; 4, respectively with primed (') reference numbers being used for the FIG. 2 embodiment and being merely inserted together with the unprimed numbers in the description when the description applies to both embodiments.

The bearing core 6, 6' exhibits a turned narrow section 11, 11' between its end flanges 9, 9' and 10, 10' in which section 11, 11' the elastic bushing 7, 7' is held. Bushing 7, 7' is provided in its middle region with an annular shaped outwardly open groove 12, 12' and comprises limit flanges 13, 13' and 14, 14' which form a clamping seat for the support member 2, 2' of the subframe 5, 5' therebetween.

In the arrangement of FIG. 1, the sheet metal cover 8 is vulcanized into the elastic bushing 7 so that an elastic layer 15 is disposed between the support member 2 and the sheet metal cover 8. According to the FIG. 2 arrangement, the sheet metal cover 8' is disposed on the outer surface of the elastic bushing 7' and an elastic layer 15' is vulcanized onto the outer surface of the sheet metal cover 8.

The sheet metal cover 8, 8' is advantageously provided with outwardly bent leg or rim portions 16, 16' which strengthen the upper limit or boundary flange 13, 13' of the elastic bushing 17, 17' by forming an abutment for the support member 2, 2' of the subframe 5, 5' in the verticle loading direction. The lower limit flange 14, 14' of the elastic bushing 7, 7' is formed as an annular ring which overlaps a rim section 26, 26' of the corresponding receiving opening 27, 27' in the support member 2, 2' of the subframe 5, 5'.

The subframe 5, 5' is held by several elastic bearings 3; 4 at the support member 1, 1' of the main frame structure. The bearings respectively exhibit the largest possible area at base 17, 17' by which they are supported at the underside of the support member 1, 1'. This base 17, 17' is formed at a top surface of the limit flange 10, 10' of the core 6, 6'. In the region of this reinforcement connection of the bearing 3; 4 at the support member 1, 1' impedance increasing elements 18, 18', 18" (FIG. 1), 19, 19', 20, 20' are provided. These impedance increasing elements form a separating plane x—x, (x'—x' in FIG. 2) between the support member 2, 2' and the bearings 3; 4. Vibrations transmitted from the subframe 5, 5' into the region of the separating plane x—x, (x'—x') are deflected back to the bearing 3; 4 to be absorbed or reduced in the elastic part 7, 7'.

The impedance increasing elements essentially comprise pot shaped sheet metal pressed parts 18, 18', 18" and 19, 19' packed inside one another and fixedly connected with the support member 1, 1' for example by welding and exhibit connection junction which are relatively highly stiffened or reinforced. In order to further raise the impedance of the reinforcement region a point mass 20, 20' is disposed coaxial to the bearing core 6, 6' in the support member 2, 2'. Mass 20 serves simultaneously as a stop element for the bearing 3; 4 in the support member 1, 1' and exhibits therefor a pocket bore 21 (FIG. 1) in which a centrally disposed screw 31 through the core 6 is fastened. The screw or bolt 31 is disposed in the bearing core with play so that it is possible to accommodate tolerance differences. In the FIG. 2 embodiment a bolt 31A and nut 31B clampingly connect core 6' to sheet metal pressed parts 18', 19'.

The point mass 20 is advantageously held by being clamped with its lower region 28 in pot-shaped sheet metal pressed part 19, while in its upper region 29 it is pressed by a trough shaped compressed bearer wall section 30 toward the sheet metal pressed part 18 (FIG. 1). This arrangement of the point mass 20 results in a friction effect between the mass and the restraint system. A similar clamping arrangement can also be provided for the point mass 20' of FIG. 2.

To limit the verticle up and down movement of the subframe 5 in the direction of arrows 22 and 23 there are provided upper limits 24, 24' and lower limits 25, 25'. The upper limit 24, 24' is formed via the pot-shaped sheet metal pressed part 18" (FIG. 1) or 18' (FIG. 2), which abuts against the compression cushion formed by elastic limit flange 13, 13' of the bushing 7, 7'. The lower limit is formed by means of the limit stop disc 25, 25' at which the tension pad or bumper lower elastic limit flange 14, 14' of the bushing 7, 7' abuts.

A change or adjustment of the separation of the bearing can be accomplished through a tensioning of the sheet metal cover 8, 8' to change the tension of the elastic element 7, 7', 15, 15' of the bearing. An especially advantageous arrangement results if the subframe is borne at the main frame with hard bearing support characteristics in the vertical and cross directions and soft characteristics in the longitudinal direction.

While I have shown and described several preferred embodiments in accordance with the present invention, it is understood that the same is not limited thereto but is susceptible to numerous changes and modifications as would be known to those skilled in the art of the present disclosure and I, therefore, do not wish to be limited to the details shown and described therein but intend to cover all such changes and modifications as are encompassed by the scope of the appended claims.

I claim:

1. Apparatus for the vibration isolation attachment of a subframe or aggregate holder at a support member of a main frame of a motor vehicle, comprising:
   a bearing core,
   an elastic bushing surrounding the bearing core,
   first connecting means for connecting the elastic bushing to a first support member which is part of a vehicle subframe or the like, and
   second connecting means for connecting the bearing core to a second support member which is part of a main frame of a motor vehicle,
   wherein said second connecting means includes impedance increasing elements which form a vibration deflecting separation plane between the second support member and the bearing core and which provide reinforcement to said second support member.

2. Apparatus according to claim 1, wherein said bearing core exhibits a large support area base at said separation plane.

3. Apparatus according to claim 2, wherein said first connecting means includes a sheet metal cover connected by vulcanizing to the elastic bushing.

4. Apparatus according to claim 3, wherein the core exhibits a reduced diameter part for the connection thereof with the elastic bushing between end flanges of the core, wherein the middle region of the elastic bushing is formed with a radially outwardly facing annular groove, and wherein the first connecting means is formed, at least in part, by a clamping seat for the first support member in said groove.

5. Apparatus according to claim 2, wherein the core exhibits a reduced diameter part for the connection thereof with the elastic bushing between end flanges of the core, wherein the middle region of the elastic bushing is formed with a radially outwardly facing annular groove, and wherein the first connecting means is formed, at least in part, by a clamping seat for the first support member in said groove.

6. Apparatus according to claim 1, wherein several such supports are interposed between the first and second support members.

7. Apparatus according to claim 1, wherein said impedance increasing elements include one or more pot-shaped sheet metal pressed parts forming stiffeners at wall sections of the second support member, and wherein the stiffeners are dynamically fixedly connected to the second support member to form reinforced high impedance connections in the region of their support at the core.

8. Apparatus according to claim 7, wherein said impedance increasing elements include a point mass bracingly arranged in the second support member centrally of the potshaped sheet metal pressed parts and coaxial to the bearing core.

9. Apparatus according to claim 8, wherein the point mass is formed as a holding element for the bearing core at the second support member.

10. Apparatus according to claim 9, wherein the bearing core is connected to the point mass by a threaded bolt extending axially through the core.

11. Apparatus according to claim 1, wherein the elastic bushing is arranged with play between the second support member and a lower abutment disc, wherein an upper limit flange of the elastic bushing cooperates to form a compression stop cushion with respect to the second support member and wherein a lower limit flange of the elastic bushing forms a tension stop cushion together with the abutment disc.

12. Apparatus according to claim 11, wherein said first connecting means includes a sheet metal cover connected by vulcanizing to the elastic bushing.

13. Apparatus according to claim 12, wherein said sheet metal cover is provided with a radially outwardly extending strengthening flange adjacent the end thereof closest to the second support member, said strengthening flange serving to strengthen the upper limit flange of the elastic bushing.

14. Apparatus according to claim 13, wherein the lower limit flange of the elastic bushing is formed out of an annular portion which overlaps a border rim of a corresponding bearing receipt opening through the first support member.

15. Apparatus according to claim 1, wherein said first connecting means includes a sheet metal cover connected by vulcanizing to the elastic bushing.

16. Apparatus according to claim 15, wherein an elastic material layer is arranged between the sheet metal cover and the first support member.

17. Apparatus according to claim 1, wherein the bearing connection of the first and second support members exhibits hard spring support characteristics in the verticle loading direction and the vehicle cross direction and soft spring support characteristics in the vehicle longitudinal direction.

18. Apparatus for the vibration isolation attachment of a subframe or aggregate holder at a support member of a main frame of a motor vehicle, comprising;
a bearing core;
an elastic bushing surrounding the bearing core,
first connecting means for connecting the elastic bushing to a first support member which is part of a vehicle subframe or the like, and
second connecting means for connecting the bearing core to a second support member which is part of a main frame of a motor vehicle,
wherein said second connecting means includes impedanc increasing elements which form a vibration deflecting separation plane between the second support member and the bearing core, and wherein said impedance increasing elements include one or more pot-shaped sheet metal pressed parts forming stiffeners at wall sections of the second support member, and wherein the stiffeners are dynamically fixedly connected to the second support member to form reinforced high impedance connections in the region of their support at the core, and wherein said impedance increasing elements include a point mass bracingly arranged in the second support member centrally of the pot-shaped sheet metal pressed parts and coaxial to the bearing core.

19. Apparatus according to claim 18, wherein the point mass is formed as a holding element for the bearing core at the second support member.

20. Apparatus according to claim 19, wherein the bearing core is connected to the point mass by a threaded bolt extending axially through the core.

* * * * *